United States Patent [19]

Fukahori et al.

[11] Patent Number: 4,999,659
[45] Date of Patent: Mar. 12, 1991

[54] CONNECTOR DEVICE FOR A CAMERA

[75] Inventors: Hidehiko Fukahori; Mutsuhide Matsuda, both of Yokohama, Japan

[73] Assignee: Canon Kabushiki Kaisha, Tokyo, Japan

[21] Appl. No.: 436,106

[22] Filed: Nov. 15, 1989

Related U.S. Application Data

[63] Continuation of Ser. No. 279,233, Nov. 29, 1988, abandoned, which is a continuation of Ser. No. 205,486, Jun. 1, 1988, abandoned, which is a continuation of Ser. No. 16,653, Feb. 19, 1987, abandoned.

[30] Foreign Application Priority Data

Feb. 24, 1986 [JP] Japan .................. 61-37484

[51] Int. Cl.[5] ............................................. G03B 17/00
[52] U.S. Cl. .................................................... 354/286
[58] Field of Search ................. 354/286; 350/252, 257

[56] References Cited

U.S. PATENT DOCUMENTS

| | | | |
|---|---|---|---|
| 4,448,509 | 5/1984 | Katsuma et al. | 354/286 |
| 4,457,609 | 7/1984 | Tomino et al. | 354/286 |
| 4,464,034 | 8/1984 | Tomino | 354/286 |
| 4,596,454 | 6/1986 | Kawai et al. | 354/286 |
| 4,853,725 | 8/1989 | Matsuda | 354/286 |

FOREIGN PATENT DOCUMENTS

| | | |
|---|---|---|
| 3106592 | 3/1982 | Fed. Rep. of Germany . |
| 56-60911 | 5/1981 | Japan . |
| 58-72132 | 4/1983 | Japan . |
| 58-83824 | 5/1983 | Japan . |
| 58-50335 | 11/1983 | Japan . |
| 59-152424 | 8/1984 | Japan . |
| 54-108628 | 8/1989 | Japan . |

OTHER PUBLICATIONS

Foto Einkaufsfuhren, 1981, pp. 125–131.
Photographic Industries, Dec. 1981.
Phot Argus, Nov. 1977.
Nippon Camera, Oct. 1984.
Modern Photography, Oct. 20, 1977.
Photographic Industries, Feb. 1977.

Primary Examiner—L. T. Hix
Assistant Examiner—David M. Gray
Attorney, Agent, or Firm—Fitzpatrick, Cella, Harper & Scinto

[57] ABSTRACT

A connector for a camera having a camera body side mount and a rotatively mountable-dismountable type optical accessory side mount capable of being coupled and uncoupled by the rotation thereof relative to the camera body side mount and in which a plurality of camera body side connection terminals are formed on the peripheral area of the camera body side mount and a plurality of optical accessory side connection terminals adapted to contact the camera body side connection terminals during rotative coupling are formed on the peripheral area of the optical accessory side mount to thereby enable the communication therebetween includes at least one level difference provided at the height of the camera body side connection terminals in the direction of contact, and a level difference provided at the height of the optical accessory side connection terminals in the direction of contact. The level difference of the optical accessory side connection terminals is substantially coincident with the level difference of the camera body side connection terminals during the rotative coupling.

116 Claims, 5 Drawing Sheets

CONNECTOR DEVICE FOR A CAMERA

This application is a continuation of application Ser. No. 279,233 filed Nov. 29, 1988, which is a continuation of application Ser. No. 205,486 filed June 1, 1988, which is a continuation of application Ser. No. 016,653 filed Feb. 19, 1987, all three applications now abandoned.

BACKGROUND OF THE INVENTION

1. Field of the Invention

This invention relates to a connector device for connecting the electric device on the interchangeable lens side and the electric device of a camera body.

2. Related Background Art

In interchangeable lens type cameras using a rotatively mountable-dismountable type bayonet mount for coupling or uncoupling an interchangeable lens with a camera body by clockwise or counter-clockwise rotation thereof, electric circuits have recently been provided on the interchangeable lens side and the camera body side, respectively, so that giving and receiving of various types of information such as information for automatic exposure control and information for automatic focus adjustment may be effected therebetween, and a camera provided with a number of connectors for giving and receiving of those signals near the mount has become known.

That is, as shown in FIGS. 1, 2, 6, 7 and 8 of the accompanying drawings, a camera side bayonet mount 1, a fixing lock pin 2 used during the mounting of the lens side mount and a contact seat (terminal bed) 3 forming the camera side connector are secured to the front face of the camera body 4 of a camera A, and on the contact seat 3, contact pins (terminals) $3_a$ comprising a plurality of (in the illustrated example, seven) contact pins $3_{a1}$–$3_{a7}$ are biased so as to project flush with the front face of the contact seat 3 by contact springs $3_b$ comprising contact springs $3_{b1}$–$3_{b7}$, and the contact pins $3_{a1}$–$3_{a7}$ are connected to a camera body side electric device 6 by a flexible printed plate 5. On the other hand, an interchangeable lens B holds a photo-taking lens unit 7, and a lens side bayonet mount 8, a plot-like lock groove 9 engageable by the camera side lock pin 2 and a contact seat (terminal bed) 10 constituting a lens side connector are secured to the rear end surface of the photo-taking lens unit, and contact pins (terminals) $10_a$ comprising a plurality of (in the illustrated example, seven) contact pins $10_{a1}$–$10_{a7}$ are fixed to the contact seat 10 so that the rear end portions thereof are flush with one another, and the contact pins $10_{a1}$–$10_{a7}$ are connected to a lens side electric device 12 through a flexible printed plate 11. The camera side bayonet mount 1 is formed with three clicks $1_a$–$1_c$, and the lens side bayonet mount 8 is formed with three clicks $8_a$–$8_c$.

With the interchangeable lens B being mounted on the camera A by means of the respective bayonet mounts, the surfaces of the both mounts overlap each other (the clicks $1_a$–$1_c$ and $8_a$–$8_c$ of the both mounts 1 and 8 are rotated from their non-overlapping state into their overlapping state) as shown in FIG. 6, the camera body side contact pins $3_a$ are brought into contact with the lens side contact pins $10_a$ by the contact springs $3_b$, and the contact pins $3_{a1}$–$3_{a7}$ are connected to the contact pins $10_{a1}$–$10_{a7}$, respectively, so that the camera body side electric device 6 and the lens side electric device 12 effect giving and receiving of electrical signals therebetween.

As regards the connecting operation of the contact pins resulting from the mounting of the interchangeable lens B, when the lens side contact seat 10 is moved in the direction of arrow C in accordance with the rotative mounting of the interchangeable lens B as shown in FIG. 1, the contact pins $3_{a7}$–$3_{a1}$ of the camera body side contact seat 3 are successively pushed by the inclinded surface $10_b$ at the end of the lens side contact seat 10 to compress the contact springs $3_{b7}$–$3_{b1}$. In this state, the contact pins $3_{a7}$–$3_{a1}$ are alternately pressed against and slid relative to the surface of the lens side contact seat 10 and the lens side contact pins $10_{a1}$–$10_{a7}$ so that at the point of time whereat the mounting is completed, the contact pins $3_{a1}$, $3_{a2}$, ..., $3_{a7}$ and $10_{a1}$, $10_{a2}$, ..., $10_{a7}$ contact each other on a common plane.

However, in the connector of the prior art as shown in FIGS. 1 and 2, each time the interchangeable lens B is mounted or dismounted with respect to the camera A, the lens side contact pin $10_{a1}$ slides on the camera body side contact pins $3_{a7}$–$3_{a1}$, the contact pin $10_{a2}$ slides on the contact pins $3_{a7}$–$3_{a2}$, and likewise the contact pin $10_{a7}$ slides on the contact pin $3_{a7}$. Accordingly, the camera body side contact pin $3_{a7}$ reciprocally slides on the lens side contact pins $10_{a1}$–$10_{a7}$, the contact pin $3_{a6}$ reciprocally slides on the contact pins $10_{a1}$–$10_{a6}$, and likewise the contact pin $3_{a1}$ reciprocally slides on the contact pin $10_{a1}$. Frequent repetition of mounting and dismounting has led to the occurrence of electrical problems such as decreased insulation resistance between the contacts and short-circuiting between the contacts caused by metal powder resulting from the abrasion of the contact pins, increased contact resistance caused by the oxidized films of the contact portions resulting from the peeling of the gold plating of the contact portions, and increased contact resistance caused by the adherence of the abrasion powder of the contact seats to the contact portions. These problems, in turn have led to poor durability and lack of reliability of prior art connectors shown in FIGS. 1 and 2.

Means for reducing the contact pressure between the contacts has been used to prevent such problems. However, it has been difficult to ensure contact resistance in devices which require low contact resistance, for example, terminals for power sources.

SUMMARY OF THE INVENTION

It is the object of the present invention to improve durability and reliability in a connector for effecting the giving and receiving of signals in a rotatively mountable-dismountable type bayonet mount.

DESCRIPTION OF THE PREFERRED EMBODIMENT

Figure 4:
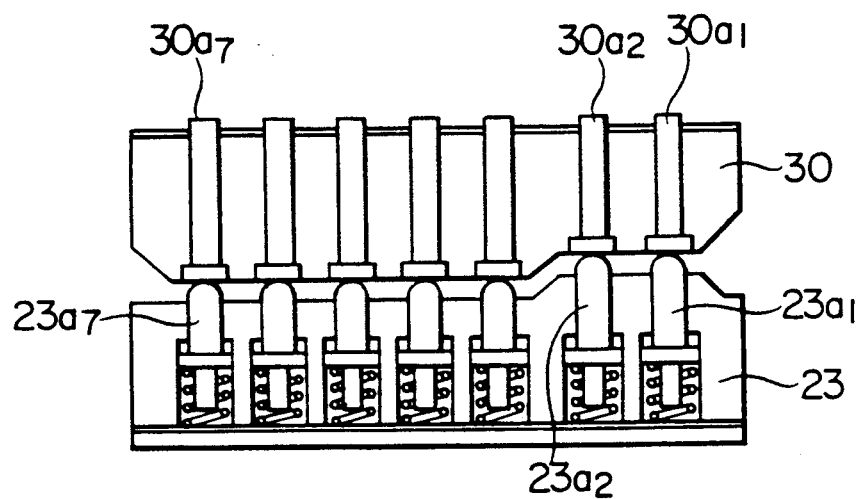
FIG. 4 is a cross-sectional view showing the essential portions of the FIG. 3 connector when the mounting thereof has been completed.
Figure 5:
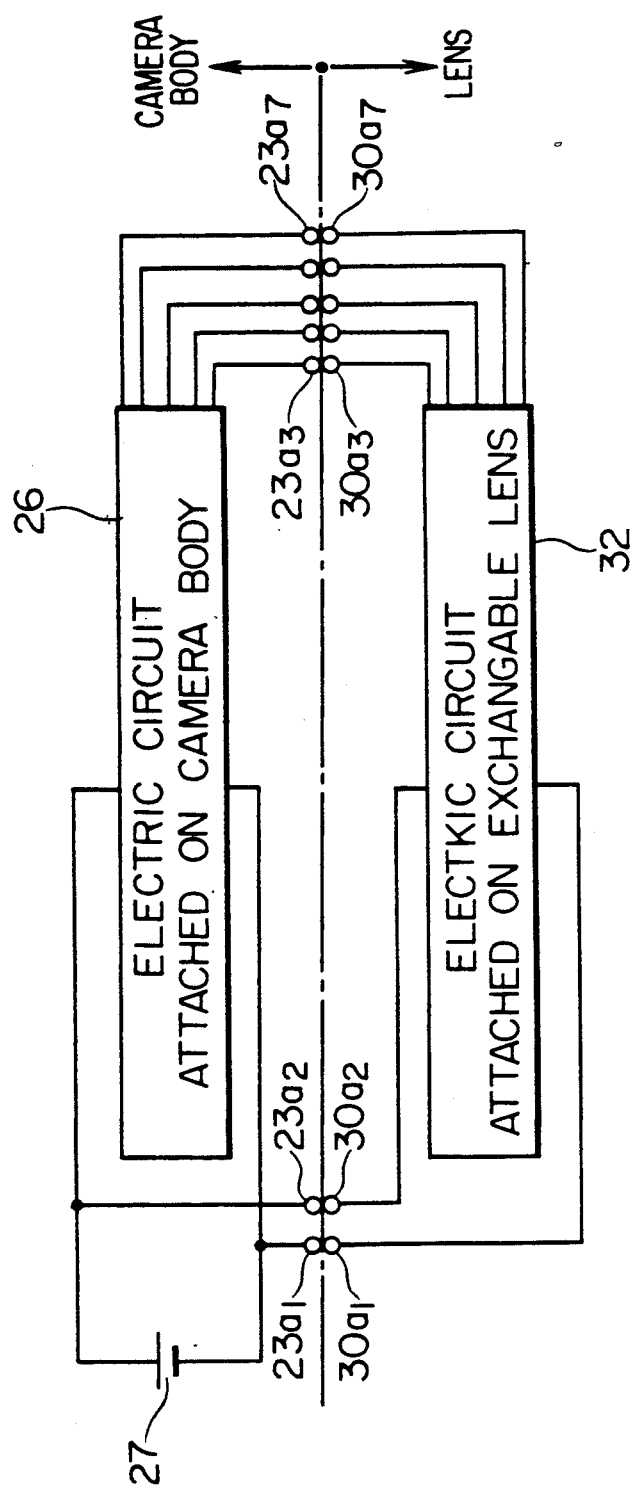
FIG. 5 shows the connection between the electric circuits on the camera body side and the interchangeable lens side.
Figure 6:
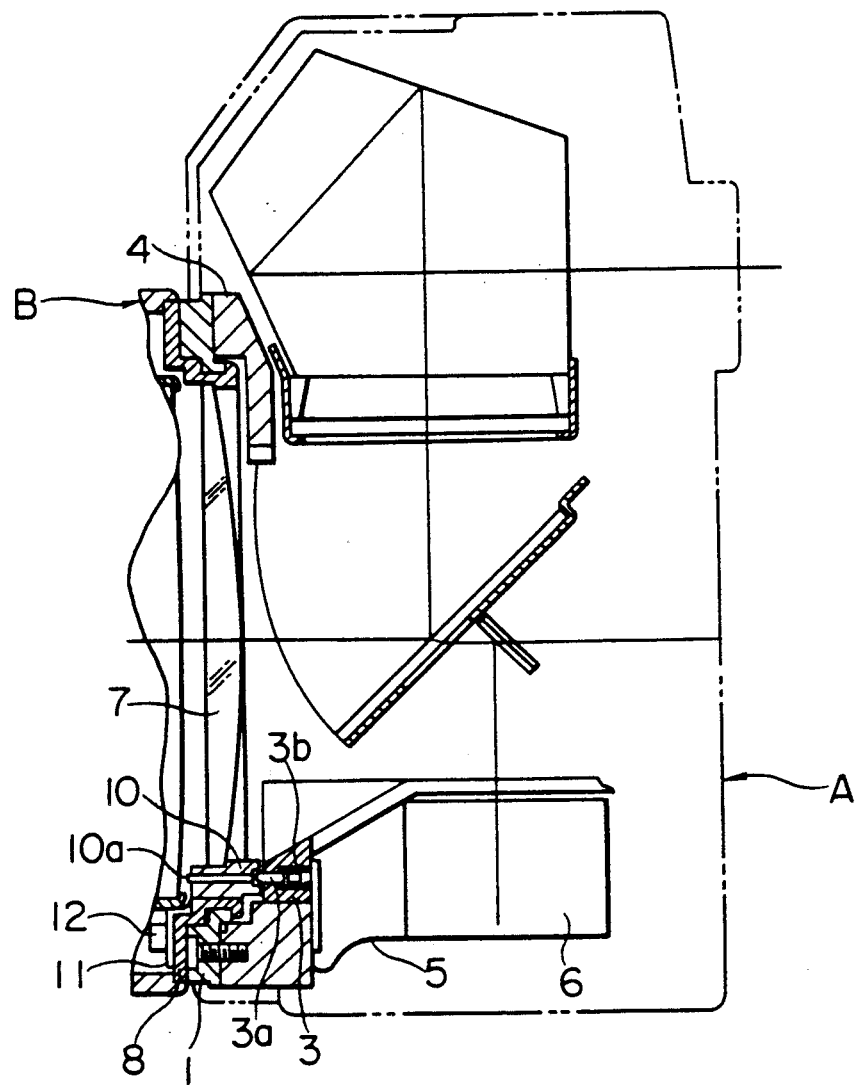
FIG. 6 is a cross-sectional view showing the essential portions of an interchangeable lens as it is mounted on a camera body according to the prior art.

An embodiment of the present invention will hereinafter be described with reference to FIGS. 3 to 5. In FIGS. 4 to 6, the members other than contact seats 3 and 10 and pins $3_a$ and $10_a$ are common to the present embodiment and therefore need not be described in detail. A contact seat (terminal bed) 23 constituting a camera body side connector is provided on the peripheral area of the rotatively mountable-dismountable type bayonet mount 1 of a camera body of the same type as the camera body 4 shown in FIG. 4. Electrical contact pins (terminals) $23_{a1}$, $23_{a2}$, . . . , $23_{a7}$ are disposed at equal internals on the contact seat 23 along the circumferential direction thereof and are biased by contact springs $23_{b1}$, $23_{b2}$, . . . , $23_{b7}$, respectively so as to project from the front face of the contact seat 23. The heights of the electrical contact pins $23_{a1}$-$23_{a7}$ in the direction of contact (the heights in the direction of the optic axis of the lens), i.e., the positions of the contact ends, are provided with a level difference such that in the non-mounted state of an interchangeable lens, the electrical contact pins $23_{a1}$ and $23_{a2}$ are higher than the other electrical contact pins $23_{a3}$-$23_{a7}$. The electrical contact pins $23_{a1}$-$23_{a7}$ are connected to an electric circuit 26 and power supply battery 27 on the camera body side by a flexible printed plate 5.

On the other hand, a contact seat (terminal bed) 30 constituting an interchangeable lens side connector is provided on the peripheral area of the rotatively mountable-dismountable type bayonet mount 8 of an interchangeable lens of the same type as that shown in FIG. 4. Electrical contact pins (terminals) $30_{a1}$, $30_{a2}$, . . . , $30_{a7}$ are secured at equal intervals to the contact seat 30 along the circumferential direction thereof. The outer contact ends of the electrical contact pins $30_{a1}$-$30_{a7}$ are formed with a level difference such that the contact surface $30_{c1}$ of the electrical contact pins $30_{a1}$ and $30_{a2}$ is lower than the contact surface $30_{c2}$ of the other electrical contact pins $30_{a3}$-$30_{a7}$. The outer end surface and level difference surface of the contact seat 30 which are adjacent to the electrical contact pin $30_{a1}$ form inclined surfaces $30_{b1}$ and $30_{b2}$, respectively. During the operation of mounting an interchangeable lens on the camera, the electrical contact pins $23_{a1}$-$23_{a7}$ on the camera body side are forced in against the biasing forces of the contact springs $23_{b1}$-$23_{b7}$. The electrical contact pins $30_{a1}$-$30_{a7}$ are connected to an electric circuit 32 (see FIG. 5) on the interchangeable lens side through a flexible printed plate 11. On the electrical contact pins $23_{a1}$-$23_{a7}$ on the camera body side, only the electrical contact pins $23_{a2}$ (for the power source) and $23_{a1}$ (for the ground) which are concerned with power supply are imparted the stronger spring pressure of the contact springs $23_{b1}$ and $23_{b2}$ as compared with the other electrical pins $23_{a3}$-$23_{a7}$ (small signals).

In the present embodiment of the above-described construction, the electrical contact pins on the interchangeable lens side and the camera body side are provided with level differences. Consequently, when an interchangeable lens is rotatively mounted on the camera in the direction of arrow C of FIG. 3, the electrical contact pins $30_{a1}$ and $30_{a2}$ on the interchangeable lens side are respectively connected to the electrical contact pins $23_{a1}$ and $23_{a2}$ on the camera body side which form a pair without contacting the electrical contact pins $23_{a7}$-$23_{a3}$ on the camera body side suring the mounting rotative movement. The other electrical contact pins $30_{a3}$-$30_{a7}$ are respectively connected to the electrical contact pins $23_{a3}$-$23_{a7}$ on the camera body side which form pairs, thus completing the mounting as shown in FIG. 4. Also, when the interchangeable lens is to be dismounted from the camera body, if it is rotated in the direction opposite to the direction of arrow C of FIG. 3, it may be dismounted by an operation converse to what has been previously described.

Figure 7:
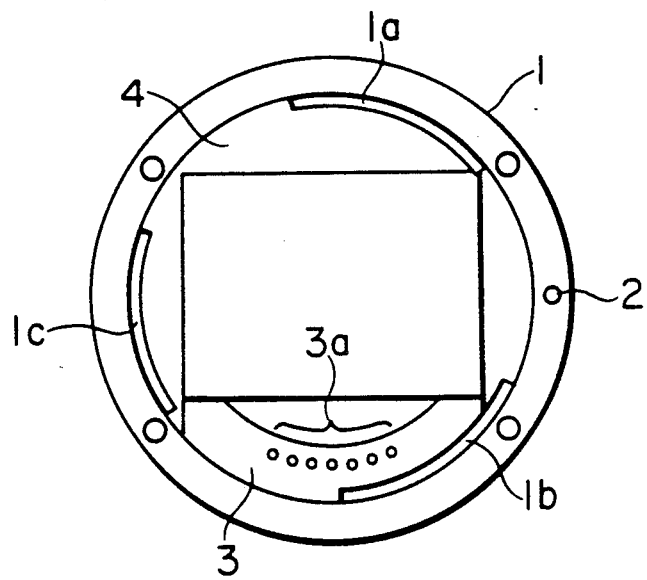
FIG. 7 is a front view of the mount portion of the camera body side according to the prior art.
Figure 8:
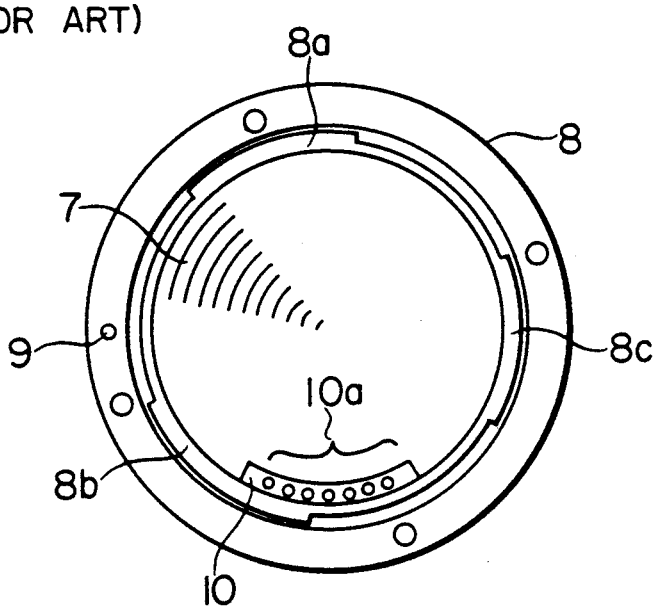
FIG. 8 is a rear view of the mount portion of the interchangeable lens side according to the prior art.

Accordingly, in the example of the prior art shown in FIGS. 7 and 8, as regards a pair of the electrical contact pins $10_{a1}$-$10_{a7}$ on the interchangeable lens side and the electrical contact pins $3_{a1}$-$3_{a7}$ on the camera body side which are connected upon completion of the mounting, the total number of the electrical contact pins which slide relative to each other until the mounting is completed is such that, for example, in the combination of the electrical contact pins $3_{a1}$ and $10_{a1}$, the electrical contact pin $3_{a1}$ makes one sliding movement relative to the electrical contact pin $10_{a1}$ and the electrical contact pin $10_{a1}$ makes seven sliding movement relative to the electrical contact pins $3_{a7}$-$3_{a1}$, thus totalling to eight sliding movements. This number of times is common to all of the electrical contact pins, i.e., Nos. 1-7. When the number of pairs of the electrical contact pins which form pairs mutually is N (in the illustrated example, N=7), the total of the number of times over which one of the electrical contact pins on the interchangeable lens side slides relative to the electrical contact pins on the camera body side during the mounting operation and the number of times over which the electrical contact pin on the camera body side which forms a pair with said one of the electrical contact pins on the interchangeable lens side upon completion of the mounting slides relative to the electrical contact pins on the interchangeable lens side is N+1.

In contrast, in the present embodiment, the number of sliding movements of the electrical contact pins Nos. 1 and 3 is reduced to three and that of the electrical contact pins Nos. 3-7 is reduced to six, whereby the abrasion of the electrical contact pins can be reduced. Also, in the present embodiment, the spring pressure of the electrical contact pins which are not concerned with power supply is set to a small value and therefore, the abrasion of the electrical contact pins Nos. 3-7 can be further reduced.

Figure 1:
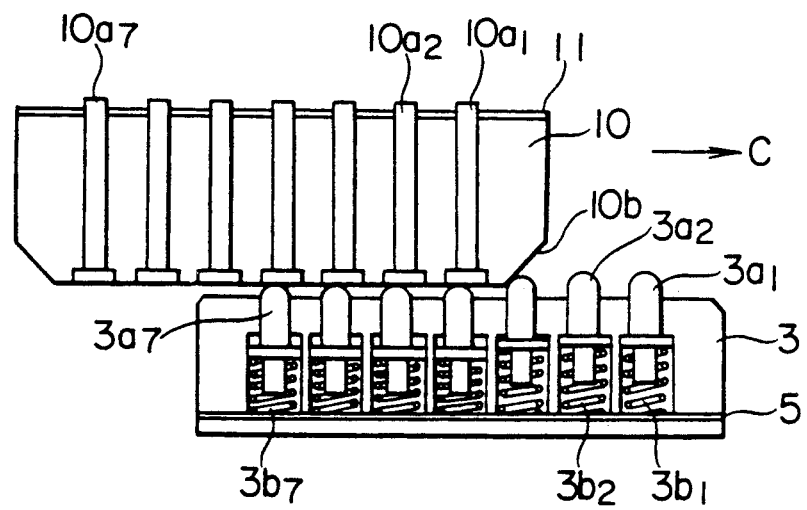
FIG. 1 is a cross-sectional view showing the essential portions of a connector according to the prior art for connecting the electric circuits of mount portions during the mounting operation thereof.
Figure 2:
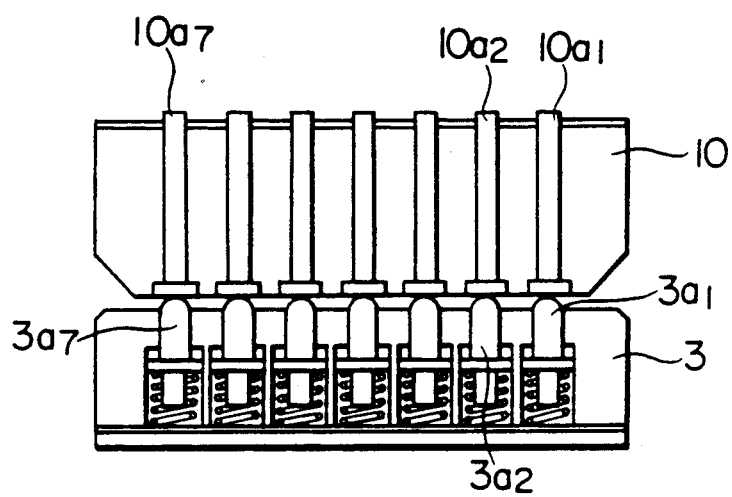
FIG. 2 is a cross-sectional view showing the essential portions of the same connector when the mounting thereof has been completed.
Figure 3:
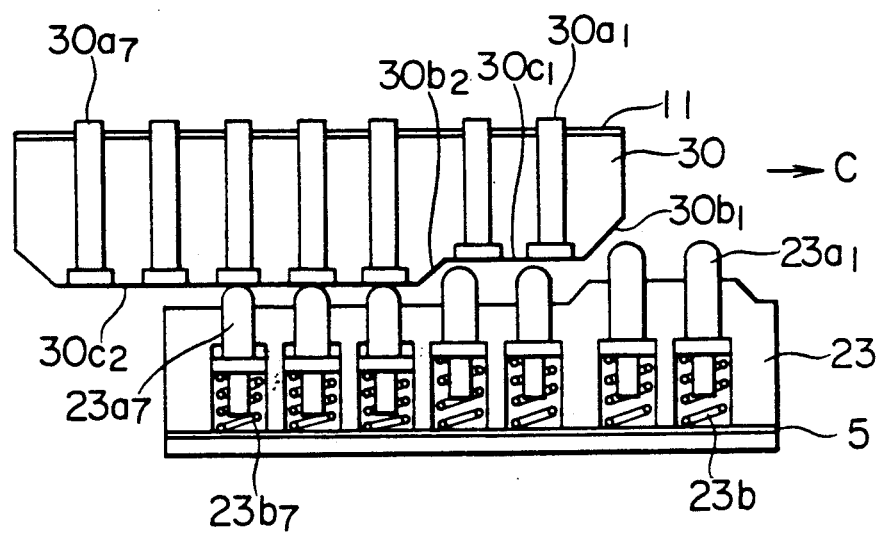
FIG. 3 is a cross-sectional view showing the essential portions of an embodiment of a connector according to the present invention for connecting the electric circuit of an interchangeable type camera during the mounting operation thereof.

In the present embodiment, as shown in FIG. 3, the electrical contact pins $23_{a3}$-$23_{a7}$ on the camera body side are of such a height that they do not contact the contact surface $30_{c1}$ on which the electrical contact pins $30_{a1}$ and $30_{a2}$ on the interchangeable lens side during the interchangeable lens mounting operation. However, even if they are disposed so as to contact the contact surface $30_{c1}$, the contact surface $30_{c1}$ escapes from the contact surface $30_{c2}$ of the electrical contact pins $30_a$-

$1-30_{a7}$ on the interhcangeable lens side contacted by the electrical contact pins $23_{a3}-23_{a7}$ on the camera body side. Therefore, the contact pressure between the contact surface $30_{c1}$ and the electrical contact pins $23_{a3}-23_{a7}$ in the course of the mounting or dismounting operation is reduced. Thus, the abrasion of the electrical contact pins can be reduced.

In the present embodiment, the number of level differences between the contact surfaces is one, but by increasing the number of level differences, the abrasion of the electrical contact pins can be further reduced.

Further, in the present embodiment, for the pair of electrical contact pins $23_{a1}$ and $30_{a1}$ and the pair of electrical contact pins $23_{a2}$ and $30_{a2}$ which are for the power supply line, the biasing forces of the contact springs $23_{b1}$ and $23_{b2}$ are made stronger and therefore, the reliability of contact can be enhanced and the contact resistance can be kept low.

Also, in the present embodiment, the power supply battery is provided on the camera body side, but alternatively, it may be provided on the interchangeable lens side.

Further, in the present embodiment, an interchangeable lens has been shown as what is mounted on the camera body side, whereas this is not restrictive, but an intermediate tube, various converters (telephoto, wide angle etc.) may also be mounted on the camera body side to obtain the effect of the present invention. That is, the present invention may be utilized with any optical accessory having a connecting terminal (S) which can contact the connecting terminal (S) on the camera body side upon completion of the mounting to thereby accomplish communication therebetween.

According to the present invention, as described above, a level difference is provided in the direction of contact between the electrical contact pins on the interchangeable lens side and on the camera body side to thereby minimize the abrasion of the electrical contact pins. This leads to the possibility of providing a connector for a camera in which problems such as increased contact pressure resulting from abrasion and decreased insulation resistance resulting from contact abrasion powder, are eliminated and which has high durability and reliability.

What we claim is:

1. A connector device for a camera having a camera body mount, a rotatively mountable-dismountable type optical accessory mount capable of being coupled and uncoupled by rotation around an optical axis thereof relative to said camera body mount, a plurality of camera body connection terminals disposed on a smaller diameter peripheral area than a mount surface of said camera body mount, and a plurality of optical accessory connection terminals, each disposed in the direction of the optical axis, and adapted to contact with said camera body connection terminals during rotative coupling, formed on a smaller diameter peripheral area than a mount surface of said optical accessory mount, said connector device comprising:

(a) at least one height level difference of said camera body connection terminals in the direction of the optical axis, said camera body connection terminals being disposed in a curvelinear formation around the optical axis;

(b) a height level difference of said optical accessory connection terminals in the direction of the optical axis, the height level difference of said optical accessory connection terminals being arranged so that the camera body connection terminals and the corresponding optical accessory connection terminals may be in contact with each other when the rotative coupling of said camera body mount and said optical accessory side mount has been completed;

(c) a locking member provided on said camera body mount; and (d) a groove provided on said optical accessory mount, said locking member being inserted into said groove when the rotative coupling of said optical accessory connection terminals and said camera body connection terminals is completed, and said groove being disposed at a position displaced by substantially 90 degrees from said optical accessory connection terminals in a direction around the optical axis.

2. A device according to claim 1, wherein either of said plurality of camera body connection terminals or said plurality of optical accessory connection terminals are supported for movement in the direction of the optical axis from a predetermined position and are biased in the direction of the optical axis by spring members.

3. A device according to claim 2, wherein all of said camera body connection terminals are movable supported in the direction of the optical axis, and all of said optical accessory connection terminals are fixedly supported.

4. A device according to claim 1, wherein at least one of said plurality of camera body connection terminals or said plurality of optical accessory connection terminals are in the form of pins.

5. A device according to claim 4, wherein at least one of said plurality of camera body connection terminals or said plurality of optical accessory connection terminals are supported by a contact seat.

6. A device according to claim 5, wherein a height level difference is formed in said contact seat corresponding to the height level difference of said plurality of connection terminals supported in said contact seat.

7. A device according to claim 6, wherein said optical accessory contact seat is projected in a backward direction of the optical axis relative to an adjacent area disposed in the peripheral direction around the optical axis.

8. A device according to claim 6, wherein end surfaces of said optical accessory connection terminals and corresponding end surfaces of said optical accessory contact seat are arranged at substantially the same height level.

9. A device according to claim 1, wherein said optical accessory comprises an interchangeable lens.

10. A device according to claim 1, wherein a position of the height level difference in said optical accessory connection terminals substantially corresponds with a position of the height level difference in said camera body connection terminals.

11. A device according to claim 1, wherein an amount of the height level difference in said optical accessory connection terminals substantially corresponds with an amount of the height level difference in said camera body connection terminals.

12. A device according to claim 1, wherein said optical accessory connection terminals are projected in a backward direction of the optical axis relative to an adjacent area disposed in the peripheral direction around the optical axis.

13. A device according to claim 1, wherein said camera body and said optical accessory connection terminals are divided into power supply terminals and signal transmitting terminals which are at a different height level from said power supply terminals.

14. A device according to claim 1, wherein said locking member is pin-shaped.

15. A device according to claim 14, wherein said groove is a slotted hole.

16. An optical accessory having a rotatively mountable-dismountable type optical accessory mount capable of being coupled and uncoupled by rotation around an optical axis thereof relative to a camera body mount having a plurality of camera body connection terminals formed on a smaller diameter peripheral area relative to said camera body mount in a curvelinear formation around the optical axis, said optical accessory comprising;
   (a) a plurality of optical accessory connection terminals disposed on a smaller diameter peripheral area of a mount surface of said optical accessory mount substantially in a curvelinear formation around the optical axis at a position for contacting said camera body connection terminals during the rotative coupling of said camera body mount and said optical accessory mount, said optical accessory connection terminals being disposed with at least a one height level difference in the direction of the optical axis which is adopted to match a corresponding height level difference in said camera body connection terminals, the height level difference being arranged so that said camera body connection terminals and said optical accessory connection terminals may be in contact with each other when the rotative coupling of said camera body mount and said optical accessory mount has been completed; and
   (b) a groove adapted to engage a locking member provided on said camera body mount, said locking member being inserted into said groove when the rotative coupling of said optical accessory connection terminals and said camera body connection terminals is completed, said groove being disposed at a position displaced by substantially 90 degrees from a center portion of said optical accessory connection terminals in a circumferential direction around the optical axis.

17. An optical accessory according to claim 16, wherein said plurality of optical accessory connection terminals are supported by a contact seat.

18. An optical accessory according to claim 17, wherein a height level difference is formed in said contact seat corresponding to the height level difference of said plurality of optical accessory connection terminals.

19. An optical accessory according to claim 18, wherein, end surfaces of said optical accessory connection terminals and corresponding end surfaces of said contact seat are arranged at substantially the same height level.

20. An optical accessory according to claim 16, wherein said optical accessory comprises an interchangeable lens.

21. An optical accessory according to claim 16, wherein all of said optical accessory connection terminals are fixedly supported.

22. An optical accessory according to claim 21, wherein said optical accessory connection terminals are projected in a backward direction of the optical axis relative to an adjacent area in the peripheral direction around the optical axis.

23. An optical accessory according to claim 16, wherein the position of the height level difference in said optical accessory connection terminals is adapted to substantially correspond with the position of the height level difference in said camera body connection terminals.

24. An optical accessory according to claim 16, wherein the amount of the height level difference in said optical accessory connection terminals is adapted to substantially correspond with the amount of the height level difference in said camera body side connection terminals.

25. An optical accessory according to claim 16, wherein said optical accessory connection terminals are divided into power supply connection terminals and signal transmitting connection terminals and are positioned on the basis of the height level difference.

26. An optical accessory according to claim 16, wherein said groove comprises a slotted hole adapted to couple with a pin-shaped locking member.

27. An optical accessory having a rotatively mountable-dismountable type optical accessory mount capable of being coupled and uncoupled by the rotation around an optical axis thereof relative to a camera body mount having a plurality of camera body connection terminals formed on a smaller diameter peripheral area than said camera body mount in a curvelinear formation around the optical axis, said optical accessory comprising:
   (a) a plurality of optical accessory connection terminals disposed on a smaller diameter peripheral area of a mount surface of said optical accessory mount substantially in curvelinear formation around the optical axis at a position for contacting said camera body connection terminals during the rotative coupling of said camera body mount and said optical accessory mount, said optical accessory connection terminals being disposed with at least one height level difference in the direction of the optical axis which is adapted to match a corresponding height level difference in said camera body connection terminals, the height level difference being arranged so that said camera body connection terminals and said optical accessory connection terminals may be in contact with each other when the rotative coupling of said camera body mount and said optical accessory has been completed;
   (b) a groove adapted to engage a locking member provided on said camera body mount, said locking member being inserted into said groove when the rotative coupling of said optical accessory connection terminals and said camera body connection terminals is completed, said groove being disposed at a position displaced by substantially 90 degrees from a center portion of said optical accessory connection terminals in a circumferential direction around the optical axis; and
   (c) a contact seat for supporting said optical accessory connection terminals, said contact seat being projected in a backward direction of the optical axis relative to an adjacent area disposed in the peripheral direction around the optical axis.

28. An optical accessory according to claim 27, wherein a height level difference is formed in said contact seat corresponding to the height level difference of said plurality of optical accessory connection terminals.

29. An optical accessory according to claim 27, wherein said optical accessory comprises an interchangeable lens.

30. An optical accessory according to claim 27, wherein all of said optical accessory connection terminals are fixedly supported.

31. An optical accessory according to claim 27, wherein a position of the height level difference in said optical accessory connection terminals is adapted to substantially correspond with a position of the height level difference in said camera body connection terminals.

32. An optical accessory according to claim 27, wherein, an amount of the height level difference in said optical accessory connection terminals is adapted to substantially correspond with an amount of the height level difference in said camera body connection terminals.

33. An optical accessory according to claim 27, wherein end surfaces of said optical accessory connection terminals in the direction of the optical axis and corresponding end surfaces of said optical accessory contact seat are arranged at substantially the same level.

34. An optical accessory according to claim 27, wherein said optical accessory connection terminals are divided into power supply connection terminals and signal transmitting connection terminals, and are positioned on the basis of the height level difference.

35. A camera body having a rotatively mountable-dismountable type camera body side mount capable of being coupled and uncoupled by the rotation around an optical axis thereof relative to an optical accessory side mount and mountable with respect to an optical accessory in which a plurality of optical accessory side connection terminals provided with at least one height level difference in the direction of the optical axis are disposed on a smaller diameter peripheral area than said optical accessory side mount in a line around the optical axis, said camera body comprising:
(a) a plurality of camera body side connection terminals disposed on a smaller diameter peripheral area of a mount surface of said camera body side mount in a line around the optical axis at a position for contacting said optical accessory side connection terminals during the rotative coupling of said optical accessory side mount and said camera body side mount and provided with at least one height level difference in the direction of the optical axis, the height level difference being arranged so that said optical accessory side connection terminals and said camera body side connection terminals may be in contact with each other when the rotative coupling of said optical accessory side mount and said camera body side mount has been completed; and
(b) a locking member for engaging with a groove provided in said optical accessory side mount, said locking member being inserted into said groove when the rotative coupling of said optical accessory side connection terminals and said camera body side connection terminals is completed, and said locking member being disposed at a position displaced by substantially 90 degrees from the center portion of said camera body side connection terminals in the direction around the optical axis.

36. A camera body according to claim 35, wherein said plurality of camera body side connection terminals are supported for movement in the direction of said optical axis from a predetermined position and are biased in the direction of the optical axis by spring members.

37. A camera body according to claim 35, wherein said plurality of connection terminals are in the form of pins.

38. A camera body according to claim 35, wherein the position of the height level difference in said camera body side connection terminals substantially corresponds with the position of the height level difference in said optical accessory side connection terminals.

39. A camera body according to claim 35, wherein the amount of the height level difference in said camera body side connection terminals substantially corresponds with the amount of the height level difference in said optical accessory side connection terminals.

40. A camera system having a camera body side mount and a rotatively mountable-dismountable type optical accessory side mount capable of being coupled and uncoupled by rotation around an optical axis thereof relative to said camera body side mount, in which a plurality of camera body side connection terminals are disposed on a smaller diameter peripheral area than a mount surface of said camera body side mount and in which a plurality of optical accessory side connection terminals, disposed in the direction of the optical axis, and adapted to contact with said camera body side connection terminals during rotative coupling, are disposed on a smaller diameter peripheral area than a mount surface of said optical accessory side mount, said plurality of camera body side connection terminals being supported for movement in the direction of said optical axis from a predetermined position and being spring biased in the direction of the optical axis, said camera system comprising:
(a) at least one specific connection terminal of said camera body side connection terminals having a stronger biasing spring force than the other terminals;
(b) at least one height level difference being provided in said camera body side connection terminals in the direction of the optical axis, said camera body side connection terminals being disposed in a line around the optical axis, and the height level difference dividing said camera side connection terminals into said at least one connection terminal and the other terminals in the direction of the optical axis; and
(c) at least one height level difference of said optical accessory side connection terminals in the direction of the optical axis, the height level difference of said optical accessory side connection terminals being arranged so that the camera body side connection terminals and the corresponding optical accessory side connection terminals may be in contact with each other when the rotative coupling of said camera body side mount and said optical accessory side mount has been completed.

41. A camera system according to claim 40, wherein all of said camera body side connection terminals are movably supported in the direction of the optical axis, and all of said optical accessory side connection terminals are fixedly supported.

42. A camera system according to claim 40, wherein the position of the height level difference in said optical accessory side connection terminals substantially corresponds with the position of the height level difference in said camera body side connection terminals.

43. A camera system according to claim 40, wherein the amount of the height level difference in said optical accessory side connection terminals substantially corresponds with the amount of the height level difference in said camera body side connection terminals.

44. A camera system according to claim 40, wherein said optical accessory side connection terminals are projected in backward direction of the optical axis relative to an adjacent area in the peripheral direction around the optical axis.

45. An optical accessory having a rotatively mountable-dismountable type optical accessory side mount capable of being coupled and uncoupled by the rotation around an optical axis thereof relative to a camera body side mount and mountable with respect to a camera body in which a plurality of camera body side connection terminals provided with at least one height level difference in the direction of the optical axis are formed on a smaller diameter peripheral area than a mount surface of said camera body side mount in a line around the optical axis, said camera body side connection terminals being supported for movement in the direction of the optical axis from a predetermined position and being spring biased in the direction of the optical axis, at least one of said connection terminals of said camera body side connection terminals having a stronger biasing spring force than the other connection terminals, said optical accessory comprising:

a plurality of optical accessory side connection terminals disposed on a smaller diameter peripheral area of a mount surface of said optical accessory side mount substantially in a line around the optical axis at a position for contacting said camera body side connection terminals during the rotative coupling of said camera body side mount and said optical accessory side mount and provided with at least one height level difference in the direction of the optical axis, the height level difference being arranged so that said camera body side connection terminals and said optical accessory side connection terminals may be in contact with each other when the rotative coupling of said camera body side mount and said optical accessory side mount has been completed, the height level difference being provided between said at least one connection terminal and the other connection terminals.

46. An optical accessory according to claim 45, wherein said plurality of connection terminals are supported by a contact seat.

47. An optical accessory according to claim 46, wherein a level difference is formed in said contact seat correspondingly to the height level difference of said plurality of connection terminals.

48. An optical accessory according to claim 47, wherein end surfaces of said optical accessory side connection terminals in the direction of the optical axis and corresponding end surfaces of said optical accessory side contact seat are disposed at substantially the same level.

49. An optical accessory according to claim 45, wherein said optical accessory is an interchangeable lens.

50. An optical accessory according to claim 45, wherein all of said optical accessory side connection terminals are fixedly supported.

51. An optical accessory according to claim 50, wherein said optical accessory side connection terminals are projected in backward direction of the optical axis relative to an adjacent area in the peripheral direction around the optical axis.

52. An optical accessory according to claim 45, wherein the position of the height level difference in said optical accessory side connection terminals substantially corresponds with the position of the height level difference in said camera body side connection terminals.

53. An optical accessory according to claim 45, wherein the amount of the height level difference in said optical accessory side connection terminals substantially corresponds with the amount of the height level difference in said camera body side connection terminals.

54. An optical accessory according to claim 45, wherein said connection terminals are divided into first connection terminals for power reception and second connection terminals for signal transmission on the basis of the height level difference.

55. A camera body having a rotatively mountable-dismountable type camera body side mount capable of being coupled and uncoupled by the rotation around an optical axis thereof relative to an optical accessory side mount and mountable with respect to the optical accessory in which a plurality of optical accessory side connection terminals provided with at least one height level difference in the direction of the optical axis are disposed on a smaller diameter peripheral area than a mount surface of said optical accessory side mount in a line around the optical axis, said camera body side connection terminals being supported for movement in the direction of the optical axis from a predetermined position and being spring biased in the direction of the optical axis, and at least one connection terminal of said camera body side connection terminals having a stronger biasing spring force than the other terminals, said camera body comprising:

a plurality of camera body side connection terminals disposed on a smaller diameter peripheral area of a mount surface of said camera body side mount substantially in a line around the optical axis at a position for contacting said optical accessory side connection terminals during the rotative coupling of said optical accessory side mount and said camera body side mount and provided with at least one height level difference in the direction of the optical axis, the height level difference being arranged so that said optical accessory side connection terminals and said camera body side connection terminals may be in contact with each other when the rotative coupling of said optical accessory side mount and said camera body side mount has been completed, and the height level difference dividing said terminals into said specific connection terminals and other terminals.

56. An optical accessory having a rotatively mountable-dismountable type optical accessory side mount capable of being coupled and uncoupled by the rotation around an optical axis thereof relative to a camera body side mount and mountable with respect to a camera body in which a plurality of camera body side connection terminals provided with at least one height level difference in the direction of the optical axis are formed on a smaller diameter peripheral area than of a mount surface of said camera body side mount in a line around the optical axis, said camera side connection terminals being supported for movement in the direction of the optical axis from a predetermined position and being spring biased in the direction of the optical axis by spring member, said optical accessory comprising:
(a) a plurality of optical accessory side connection terminals being disposed on a smaller diameter peripheral area of a mount surface of said optical accessory side mount substantially in a line around the optical axis at a position for contacting said camera body side connection terminals during the rotative coupling of said camera body side mount and said optical accessory side mount and being provided with at least a one height level difference in the direction of the optical axis, the height level difference being arranged so that said camera body side connection terminals and said optical accessory side connection terminals may be in contact with each other when the rotative coupling of said camera body side mount and said optical accessory side mount has been completed; and
(b) a contact seat for supporting said plurality of optical accessory side connection terminals, end surfaces of said optical accessory side connection terminals and corresponding end surfaces of said contact seat being disposed in substantially at the same level.

57. An optical accessory according to claim 56, wherein said optical accessory is an interchangeable lens.

58. An optical accessory according to claim 56, wherein all of said optical accessory side connection terminals are fixedly supported, and substantially correspond with the position of the height difference in said camera body side connection terminals.

59. An optical accessory according to claim 58, wherein said optical accessory side connection terminals are projected in backward direction of the optical axis relative to an adjacent area in the peripheral direction around the optical axis.

60. An optical accessory according to claim 56, wherein the amount of the height level difference in said optical accessory side connection terminals substantially corresponds with the amount of the height level difference in said camera body side connection terminals.

61. An optical accessory according to claim 56, wherein said connection terminals are divided into first connection terminals for power reception and second connection terminals for signal transmission on the basis of the height level difference.

62. A camera system having a camera body side mount and a rotatively mountable-dismountable type optical accessory side mount capable of being coupled and uncoupled by the rotation around an optical axis thereof relative to said camera body side mount, in which a plurality of camera body side connection terminals are disposed on a smaller diameter peripheral area than a mount surface of said camera body side mount and a plurality of optical accessory side connection terminals, disposed in the direction of the optical axis, and adapted to contact said camera body side connection terminals during rotative coupling, are disposed on a smaller diameter peripheral area than a mount surface of said optical accessory side mount, said camera system comprising:
(a) at least one height level difference of said camera body side connection terminals in the direction of the optical axis, said camera body side connection terminals being disposed in a line around the optical axis; and
(b) a height level difference of said optical accessory side connection terminals in the direction of the optical axis, the height level difference of said optical accessory side connection terminals being arranged so that said camera body side connection terminals and said corresponding optical accessory side connection terminals may be in contact with each other when the rotative coupling of said camera body side mount and said optical accessory side mount has been completed, said optical accessory side connection terminals being composed of a first group having a connection terminal for power supply and a second group having a plurality of connection terminals for data communication, said first group and said second group being arranged at the different height level, and said second group being projected rearwardly in the direction of the optical axis relative to said first group.

63. A camera system according to claim 62, wherein either of said plurality of connection terminals are supported for movement in the direction of said optical axis from a predetermined position and are biased in the direction of the optical axis by spring members.

64. A camera system according to claim 63, wherein all of said camera body side connection terminals are movably supported in the direction of the optical axis, and all of said optical accessory side connection terminals are fixedly supported.

65. A camera system according to claim 62, wherein said plurality of connection terminals are in the form of pins.

66. A camera system according to claim 65, wherein said plurality of connection terminals are supported by a contact seat.

67. A camera system according to claim 66, wherein a height level difference is formed in said contact seat correspondingly to the height level difference of said plurality of connection terminals.

68. A camera system according to claim 67, wherein said optical accessory side contact seat is projected in backward direction of the optical axis relative to adjacent area in the peripheral direction around the optical axis.

69. A camera system according to claim 67, wherein end surfaces of said optical accessory side connection terminals in the direction of the optical axis and corresponding end surfaces of said optical accessory side contact seat are arranged at substantially the same level.

70. A camera system according to claim 62, wherein said optical accessory is an interchangeable lens.

71. A camera system according to claim 62, wherein the position of the height level difference in said optical accessory side connection terminals substantially corresponds with the position of the height level difference in said camera body side connection terminals.

72. A camera system according to claim 62, wherein the amount of the height level difference in said optical accessory side connection terminals substantially corresponds with the amount of the height level difference in said camera body side connection terminals.

73. A camera system according to claim 62, wherein said optical accessory side connection terminals are projected in backward direction of the optical axis relative to an adjacent area in the peripheral direction around the optical axis.

74. An optical accessory having a rotatively mountable-dismountable type optical accessory side mount capable of being coupled and uncoupled by the rotation around an optical axis thereof relative to a camera body side mount and mountable with respect to a camera body in which a plurality of camera body side connection terminals provided with at least one height level difference in the direction of the optical axis are disposed on a smaller diameter peripheral area than a mount surface of said camera body side mount in a line around the optical axis, said optical accessory comprising:

a plurality of optical accessory side connection terminals disposed on a smaller diameter peripheral area of a mount surface of said optical accessory side mount substantially in a line around the optical axis at a position for contacting said camera body side connection terminals during rotative coupling of said camera body side mount and said optical accessory side mount and provided with at least one height level difference in the direction of the optical axis, the height level difference being arranged so that said camera body side connection terminals and said optical accessory side connection terminals may be in contact with each other when the rotative coupling of said camera body side mount and said optical accessory side mount has been completed, said optical accessory side connection terminals being composed of a first group having a connection terminal for power supply and a second group having a plurality of connection terminals for data communication, said first group and said second group being disposed at the height level difference, and said second group being projected rearwardly relative to said first group.

75. An optical accessory according to claim 74, wherein said plurality of connection terminals are supported by a contact seat.

76. An optical accessory according to claim 75, wherein a height level difference is formed in said contact seat correspondingly to the height level difference of said plurality of connection terminals.

77. An optical accessory according to claim 76, wherein end surfaces of said optical accessory side connection terminals in the direction of the optical axis and corresponding end surfaces of said optical accessory side contact seat are arranged at substantially the same level.

78. An optical accessory according to claim 74, wherein said optical accessory is an interchangeable lens.

79. An optical accessory according to claim 74, wherein all of said optical accessory side connection terminals are fixedly supported.

80. An optical accessory according to claim 79, wherein said optical accessory side connection terminals are projected in a backward direction of the optical axis relative to an adjacent area in the peripheral direction around the optical axis.

81. An optical accessory according to claim 74, wherein the position of the height level difference in said optical accessory side connection terminals substantially corresponds with the position of the height level difference in said camera body side connection terminals.

82. An optical accessory according to claim 74, wherein the amount of the height level difference in said optical accessory side connection terminals substantially corresponds with the amount of the height level difference in said camera body side connection terminals.

83. An optical accessory having a rotatively mountable dismountable type optical accessory mount capable of being coupled and uncoupled by rotation around an optical axis thereof relative to a main body mount having a plurality of main body connection terminals formed on a smaller diameter peripheral area relative to said main body mount in a curvelinear formation around the optical axis, said optical accessory comprising;

(a) a plurality of optical accessory connection terminals disposed on a smaller diameter peripheral area of a mount surface of said optical accessory mount substantially in a curvelinear formation around the optical axis at a position for contacting said main body connection terminals during the rotative coupling of said main body mount and said optical accessory mount, said optical accessory connection terminals being disposed with at least a one height level difference therebetween in the direction of the optical axis which is adapted to match a corresponding height level difference in said main body connection terminals, the height level difference being arranged so that said main body connection terminals and said optical accessory connection terminals may be in contact with each other when the rotative coupling of said main body mount and said optical accessory mount has been completed; and (b) a groove adapted to engage a locking member provided on said main body mount, said locking member being inserted into said groove when the rotative coupling of said optical accessory connection terminals and said main body connection terminals is completed, said groove being disposed at a position displaced by substantially 90 degrees from a center portion of said optical accessory connection terminals in a circumferential direction around the optical axis.

84. An optical accessory according to claim 83, wherein said plurality of optical accessory connection terminals are supported by a contact seat.

85. An optical accessory according to claim 84, wherein a height level difference is formed in said contact seat corresponding to the height level difference of said plurality of optical accessory connection terminals.

86. An optical accessory according to claim 85, wherein, end surfaces of said optical accessory connection terminals and corresponding end surfaces of said optical accessory contact seat are arranged at substantially the same height level.

87. An image forming apparatus having a rotatively mountable-dismountable type main body side mount capable of being coupled and uncoupled by the rotation around an optical axis thereof relative to an optical accessory side mount and mountable with respect to an optical accessory in which a plurality of optical accessory side connection terminals provided with at least one height level difference therebetween in the direction of the optical axis are disposed on a smaller diameter peripheral area than said optical accessory side mount in a line around the optical axis, said image apparatus comprising:

(a) a plurality of main body side connection terminals disposed on a smaller diameter peripheral area of a mount surface of said main body side mount in a line around the optical axis at a position for contacting said optical accessory side connection terminals during the rotative coupling of said optical accessory side mount and said main body side mount and provided with at least one height level difference therebetween in the direction of the optical axis, the height level difference being arranged so that said optical accessory side connection terminals and said main body side connection terminals may be in contact with each other when the rotative coupling of said optical accessory side mount and said main body side mount has been completed; and (b) a locking member for engaging with a groove provided in said optical accessory side mount, said locking member being inserted into said groove when the rotative coupling of said optical accessory side connection terminals and said main body side connection terminals is completed, and said locking member being disposed at a position displaced by substantially 90 degrees from the center portion of said main body side connection terminals in the direction around the optical axis.

88. An image forming apparatus according to claim 87, where the position of the height level difference in said main body side connection terminals substantially corresponds with the accessory side connection terminals.

89. An image forming apparatus according to claim 88, wherein the amount of the height level difference in said main body side connection terminals substantially corresponds with the amount of the height level difference in said optical accessory side connection terminals.

90. An optical accessory having a rotatively mountable-dismountable type optical accessory side mount capable of being coupled and uncoupled by the rotation around an optical axis thereof relative to a main body side mount and mountable with respect to a main body in which a plurality of main body side connection terminals provided with at least one height level difference therebetween in the direction of the optical axis are formed on a smaller diameter peripheral area than a mount surface of said main body side mount in a curved line around the optical axis, said main body side connection terminals being supported for movement in the direction of the optical axis from a predetermined position and being spring biased in the direction of the optical axis, at least one connection terminal of said main body side connection terminals having a stronger biasing spring force than the other connection terminals, said optical accessory comprising:

a plurality of optical accessory side connection terminals disposed on a smaller diameter peripheral area of a mount surface of said optical accessory side mount substantially in a curved line around the optical axis at a position for contacting said main body side connection terminals during the rotative coupling of said main body side mount and said optical accessory side mount and provided with at least one height level difference therebetween in the direction of the optical axis, the height level difference being arranged so that said main body side connection terminals and said optical accessory side connection terminals may be in contact with each other when the rotative coupling of said main body side mount and said optical accessory side mount has been completed, the height level difference being provided between said at least one connection terminal and the other connection terminals.

91. An optical accessory according to claim 90, wherein said plurality of connection terminals are supported by a contact seat.

92. An optical accessory according to claim 91, wherein a level difference is formed in said contact seat correspondingly to the height level difference of said plurality of connection terminals.

93. An optical accessory according to claim 92, wherein end surfaces of said optical accessory side connection terminals in the direction of the optical axis and corresponding end surfaces of said optical accessory side contact seat are disposed at substantially the same height level.

94. An image forming apparatus having a rotatively mountable-dismountable type main body side mount capable of being coupled an uncoupled by the rotation around an optical axis thereof relative to an optical accessory side mount and mountable with respect to the optical accessory in which a plurality of optical accessory side connection terminals provided with at least one height level difference therebetween in the direction of the optical axis are disposed on a smaller diameter peripheral area than a mount surface of said optical accessory side mount in a line around the optical axis, said main body side connection terminals being supported for movement in the direction of the optical axis from a predetermined position and being spring biased in the direction of the optical axis, and at least one connection terminal of said main body side connection terminals having a stronger biasing spring force than the other terminals, said image forming apparatus comprising:

a plurality of main body side connection terminals disposed on a smaller diameter peripheral area of a mount surface of said main body side mount substantially in a curved line around the optical axis at a position for contacting said optical accessory side connection terminals during the rotative coupling of said optical accessory side mount and said main body side mount and provided with at least one height level difference therebetween in the direction of the optical axis, the height level difference being arranged so that said optical accessory side connection terminals and said main body side connection terminals may be in contact with each other when the rotative coupling of said optical accessory side mount and said main body side mount has been completed, and the height level difference dividing said terminals according to the function of said terminals.

95. An optical accessory having a rotatively mountable-dismountable type optical accessory side mount capable of being coupled and uncoupled by the rotation around an optical axis thereof relative to a main body side mount and mountable with respect to a main body in which a plurality of main body side connection terminals provided with at least one height level therebetween difference in the direction of the optical axis are formed on a smaller diameter peripheral area than a mount surface of said main body side mount in a curved line around the optical axis, said main body side connection terminals being supported for movement in the direction of the optical axis from a predetermined position and being spring biased in the direction of the optical axis by a spring member, said optical accessory comprising:

(a) a plurality of optical accessory side connection terminals being disposed on a smaller diameter peripheral area of a mount surface of said optical accessory side mount substantially in a curved line around the optical axis at a position for contacting said main body side connection terminals during the rotative coupling of said main body side mount and said optical accessory side mount and being provided with at least a one height level difference therebetween in the direction of the optical axis, the height level difference being arranged so that said main body side connection terminals and said optical accessory side connection terminals may be in contact with each other when the rotative coupling of said main body side mount and said optical accessory side mount and said optical accessory side mount has been completed; and (b) a contact seat for supporting said plurality of optical accessory side connection terminals, end surfaces of said optical accessory side connection terminals and corresponding end surfaces of said contact seat being disposed substantially at the same level.

96. An optical accessory having a rotatively mountable-dismountable type optical accessory side mount capable of being coupled and uncoupled by the rotation around an optical axis thereof relative to a main body side mount and mountable with respect to a main body in which a plurality of main body side connection terminals provided with at least one height level difference in the direction of the optical axis are disposed on a smaller diameter peripheral area than a mount surface of said main body side mount in a line around the optical axis, said optical accessory comprising:

a plurality of optical accessory side connection terminals disposed on a smaller diameter peripheral area of a mount surface of said optical accessory side mount substantially in a curved line around the optical axis at a position for contacting said main body side connection terminals during rotative coupling of said main body side mount and said optical accessory side mount and provided with at least one height level difference in the direction of the optical axis, the height level difference being arranged so that said main body side connection terminals and said optical accessory side connection terminals may be in contact with each other when the rotative coupling of said main body side mount and said optical accessory side mount has been completed, said optical accessory side connection terminals being composed of a first group having a connection terminal for power supply and a second group having a plurality of connection terminals for data communication, said first group and said second group being disposed at the height level difference, and said second group being projected rearwardly relative to said first group.

97. An optical accessory according to claim 96, wherein said plurality of connection terminals are supported by a contact seat.

98. An optical accessory according to claim 97, wherein a height level difference is formed in said contact seat correspondingly to the height level difference of said plurality of connection terminals.

99. An optical accessory according to claim 98, wherein end surfaces of said optical accessory side connection terminals in the direction of the optical axis and corresponding end surfaces of said optical accessory side contact seat are arranged at substantially the same level.

100. An optical accessory having a rotatively mountable dismountable type first mount capable of being coupled and uncoupled by rotation around an optical axis thereof relative to a second mount having a plurality of second connection terminals formed on a smaller diameter peripheral area relative to a mount surface of said second mount around the optical axis, said optical accessory comprising:

(a) a plurality of first connection terminals disposed on a smaller diameter peripheral area of a mount surface of said first mount substantially around the optical axis, said first connection terminals being disposed with at least a one height level difference in the direction of the optical axis which is adapted to match a corresponding height level difference in said second connection terminals, the height level difference being arranged so that said second connection terminals and said first connection terminals may be in contact with each other when the rotative coupling of said second mount and said first mount has been completed; and (b) a receiving portion adapted to engage a locking member provided on said second mount, said locking member being contacted into said receiving portion when the rotative coupling of said first connection terminals and said second connection terminals is completed, said receiving portion being disposed at a position displaced by substantially 90 degrees from at least one of said first connection terminals in a circumferential direction around the optical axis.

101. An optical accessory according to claim 100, wherein said plurality of first connection terminals are supported by a contact seat.

102. An optical accessory according to claim 101, wherein a height level difference is formed in said contact seat corresponding to the height level difference of said first connection terminals.

103. An optical accessory according to claim 102, wherein end surfaces of said first connection terminals and corresponding end surfaces of said contact seat are arranged at substantially the same height level.

104. An image forming apparatus having a rotatively mountable-dismountable type second mount capable of being coupled and uncoupled by the rotation around and optical axis thereof relative to a first mount and mountable with respect to an optical accessory in which a plurality of first connection terminals provided with at least one height level difference in the direction of the optical axis are disposed on a smaller diameter peripheral area than a mount surface of said first mount around the optical axis, said image apparatus comprising:

(a) a plurality of second connection terminals disposed on a smaller diameter peripheral area of a mount surface of said second mount around the optical axis and provided with at least one height level difference in the direction of the optical axis, the height level difference being arranged so that said first connection terminals and said second connection terminals may be in contact with each other when the rotative coupling of said first mount and said second mount has been completed; and (b) a locking member for engaging with a receiving portion provided in said first mount, said locking member being contacted at said receiving portion when the rotative coupling of said first connection terminals and said second connection terminals is completed, and said locking member being disposed at a position displaced by substantially 90 degrees from at least one of said second connection terminals in the direction around the optical axis.

105. An image forming apparatus according to claim 104, wherein the position of the height level difference in said second connection terminals substantially corresponds with the first connection terminals.

106. An image forming apparatus according to claim 105, wherein the amount of the height level difference in said second connection terminals substantially corresponds with the amount of the height level difference in said first connection terminals.

107. An optical accessory having a rotatively mountable-dismountable type first mount capable of being coupled and uncoupled by the rotation around an optical axis thereof relative to a second mount and mountable with respect to a main body in which a plurality of second connection terminals provided with at least one height level difference in the direction of the optical axis are formed on a smaller diameter peripheral area than a mount surface of said second mount around the optical axis, said second connection terminals being supported for movement in the direction of the optical axis from a predetermined position and being spring biased in the direction of the optical axis, at least one of said second connection terminals having a stronger biasing spring force than the other connection terminals, said optical accessory comprising:

a plurality of first connection terminals disposed on a smaller diameter peripheral area of a mount surface of said first mount substantially around the optical axis and provided with at least one height level difference in the direction of the optical axis, the height level difference being arranged so that said second connection terminals and said first connection terminals may be in contact with each other when the rotative coupling of said second mount and said first mount has been completed, the height level difference being provided between said at least one connection terminal and the other connection terminals.

108. An optical accessory according to claim 107, wherein said plurality of connection terminals are supported by a contact seat.

109. An optical accessory according to claim 108, wherein a level difference is formed in said contact seat correspondingly to the height level difference of said plurality of connection terminals.

110. An optical accessory according to claim 109, wherein end surfaces of said first connection terminals in the direction of the optical axis and corresponding end surfaces of said first contact seat are disposed at substantially the same height level.

111. An image forming apparatus having a rotatively mountable-dismountable type second mount capable of being coupled and uncoupled by the rotation around an optical axis thereof relative to a first mount and mountable with respect to the optical accessory in which a plurality of first connection terminals provided with at least one height level difference in the direction of the optical axis are disposed on a smaller diameter peripheral area than a mount surface of said first mount around the optical axis, said second connection terminals being supported for movement in the direction of the optical axis from a predetermined position and being spring biased in the direction of the optical axis, and at least one connection terminals of second connection terminals having a stronger biasing spring force than the other terminals, said image apparatus comprising:

a plurality of second connection terminals disposed on a smaller diameter peripheral area a mount surface of said second mount substantially around the optical axis and provided with at least one height level difference in the direction of the optical axis, the height level difference being arranged so that said first connection terminals and said second connection terminals may be in contact with each other when the rotative coupling of said first mount and said second mount has been completed, and the height level difference being provided between said at least one connection terminal and the other connection terminals.

112. An optical accessory having a rotatively mountable-dismountable type first mount capable of being coupled and uncoupled by the rotation around an optical axis thereof relative to a second mount and mountable with respect to a main body in which a plurality of second connection terminals provided with at least one height level difference in the direction of the optical axis are formed on a smaller diameter peripheral area than said second connection terminals being supported for movement in the direction of the optical axis from a predetermined position and being spring biased in the direction of the optical axis by spring member, said optical accessory comprising:

(a) a plurality of first connection terminals being disposed on a smaller diameter peripheral area of a mount surface of said first mount substantially around the optical axis and being provided with at least a one height level difference in the direction of the optical axis, the height level difference being arranged so that said second connection terminals and said first connection terminals may be in contact with each other when the rotative coupling of said second mount and said first mount has been completed; and (b) a contact seat for supporting said first connection terminals, end surfaces of said first connection terminals and corresponding end surfaces of said contact seat being disposed substantially at the same level.

113. An optical accessory having a rotatively mountable-dismountable type first mount capable of being coupled and uncoupled by the rotation around an optical axis thereof relative to a second mount and mountable with respect to a main body in which a plurality of second connection terminals provided with at least one height level difference in the direction of the optical axis are disposed on a smaller diameter peripheral area than a mount surface of said second mount around the optical axis, said optical accessory comprising:

a plurality of first connection terminals disposed on a smaller diameter peripheral area of a mount surface of said first mount substantially in around the optical axis and provided with at least one height level difference in the direction of the optical axis, the height level difference being arranged so that said second connection terminals and said first connection terminals may be in contact with each other when the rotative coupling of said second mount and said first mount has been completed, said first connection terminals being composed of a first group having a connection terminal for power supply and a second group having a plurality of connection terminals for data communication, said first group and said second group being disposed at the height level difference, and said second group being projected rearwardly relative to said first group.

114. An optical accessory according to claim 113, wherein said plurality of connection terminals are supported by a contact seat.

115. An optical accessory according to claim 114, wherein a height level difference is formed in said contact seat correspondingly to the height difference of said plurality of connection terminals.

116. An optical accessory according to claim 115, wherein end surfaces of said first connection terminals in the direction of the optical axis and corresponding end surfaces of said contact seat are arranged at substantially the same level.

* * * * *

UNITED STATES PATENT AND TRADEMARK OFFICE
CERTIFICATE OF CORRECTION

PATENT NO. : 4,999,659    Page 1 of 3

DATED : March 12, 1991

INVENTOR(S) : Hidehiko Fukahori, et al.

It is certified that error appears in the above-identified patent and that said Letters Patent is hereby corrected as shown below:

On the title page:

[56] At References Cited [Foreign Patent Documents]:

"54-108628 8/1989 Japan" should read --54-108628 8/1979 Japan--.

SHEET 3 [Figure 5]:

"Electkic" should read --Electric--.

COLUMN 2:

Line 9, "inclinded" should read --inclined--.

Line 41, "turn" should read --turn,--.

COLUMN 3:

Line 28, "internals" should read --intervals--.

COLUMN 4

Line 13, "suring" should read --during--.

UNITED STATES PATENT AND TRADEMARK OFFICE
CERTIFICATE OF CORRECTION

PATENT NO. : 4,999,659

DATED : March 12, 1991

INVENTOR(S) : Hidehiko Fukahori, et al.

It is certified that error appears in the above-identified patent and that said Letters Patent is hereby corrected as shown below:

COLUMN 5:

Line 1, "interhcangeable" should read --interchangeable--.

COLUMN 6:

Line 26, "movable" should read --movably--.

Line 33, "are" should read --is--.

Line 37, "are" should read --is--.

COLUMN 16:

Line 5, "able dismountable" should read --able-dismountable--.

COLUMN 18:

Line 19, "an" should read --and--.

COLUMN 20:

Line 6, "able dismountable" should read --able-dismountable--.

UNITED STATES PATENT AND TRADEMARK OFFICE
CERTIFICATE OF CORRECTION

PATENT NO. : 4,999,659           Page 3 of 3

DATED : March 12, 1991

INVENTOR(S) : Hidehiko Fukahori, et al.

It is certified that error appears in the above-identified patent and that said Letters Patent is hereby corrected as shown below:

COLUMN 22:

Line 5, "connection terminals" should be deleted.

Line 9, "a" (second occurrence should read --of a--.

Signed and Sealed this

Twenty-second Day of December, 1992

Attest:

DOUGLAS B. COMER

Attesting Officer      Acting Commissioner of Patents and Trademarks